INVENTORS
Clarence C. Gerow &
Herman F. Bottcher

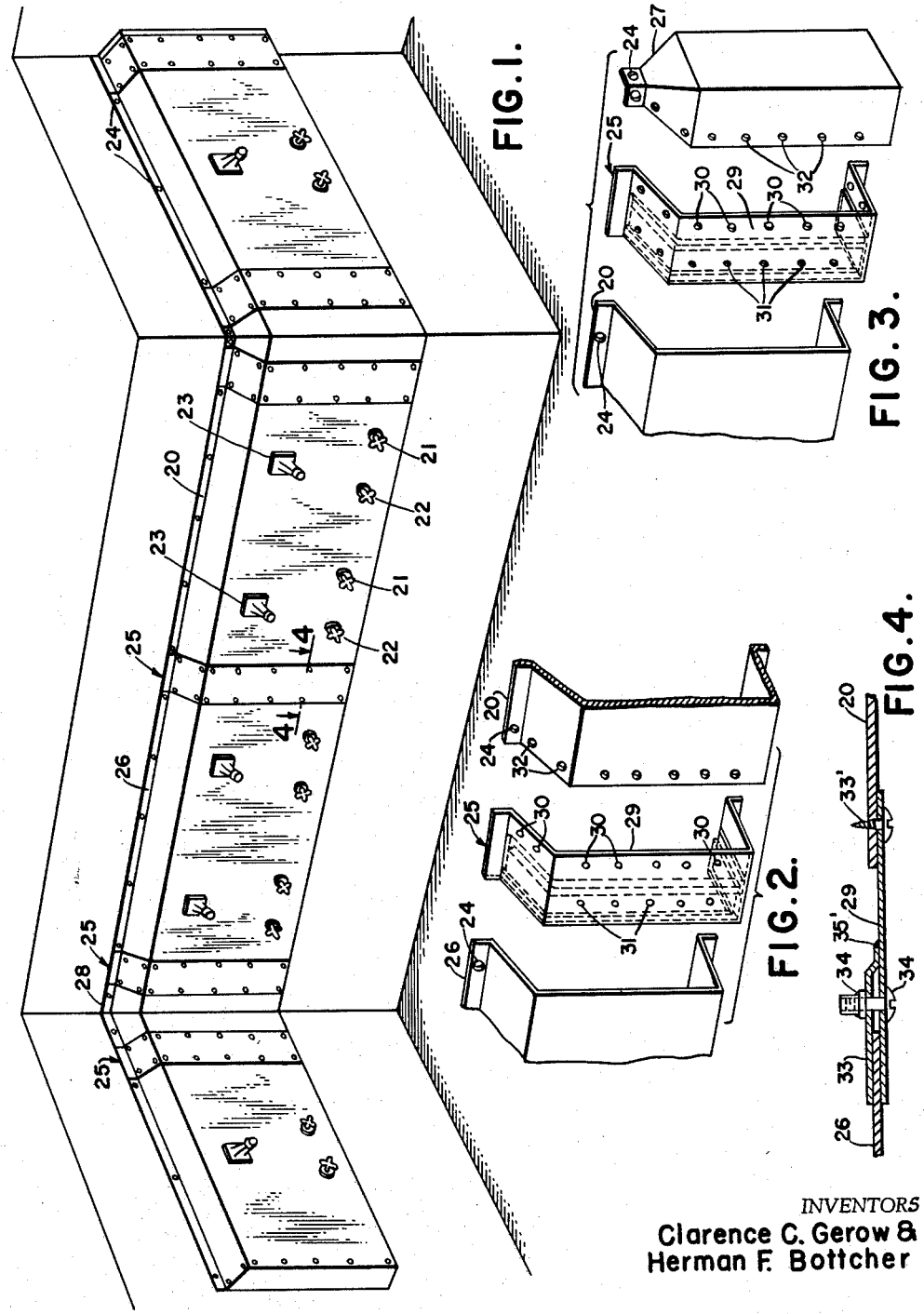

BY
ATTORNEYS

INVENTORS
Clarence C. Gerow &
Herman F. Bottcher

July 2, 1963
C. C. GEROW ETAL
3,095,581
PANEL SHOWERS
Filed Feb. 1, 1962
4 Sheets-Sheet 4
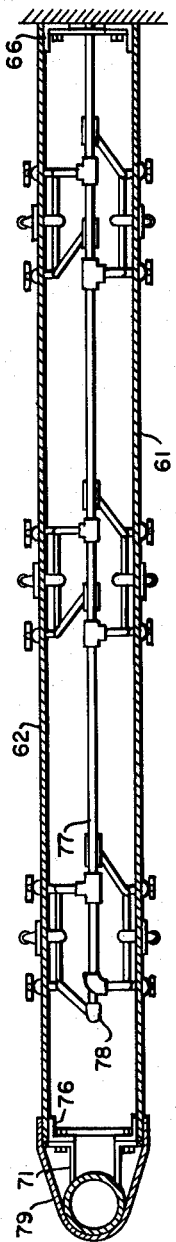
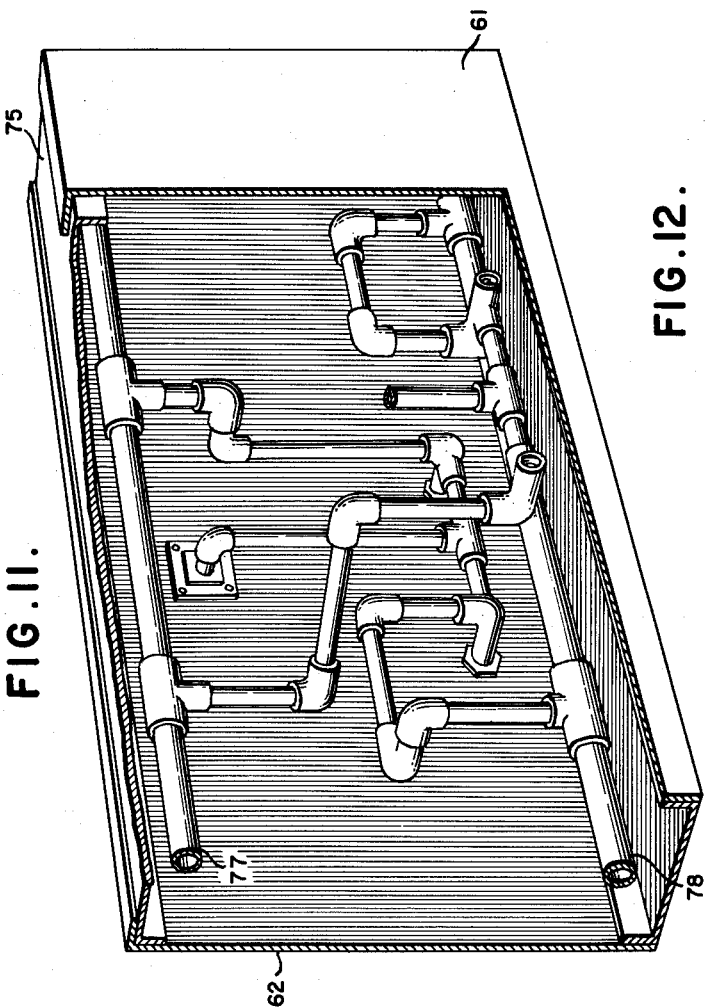
INVENTORS
Clarence C. Gerow &
Herman F. Bottcher
BY Holcombe, Wetherill & Brisebois
ATTORNEYS

# United States Patent Office 3,095,581
Patented July 2, 1963

1

3,095,581
PANEL SHOWERS
Clarence C. Gerow, Claymont, Del., and Herman F. Bottcher, Plainfield, N.J., assignors to Speakman Company, Wilmington, Del.
Filed Feb. 1, 1962, Ser. No. 170,602
7 Claims. (Cl. 4—192)

This invention relates generally to multi-station shower fixtures, and more in particular to panel fixtures that are mounted on the wall or between two supports within the room.

In the past it has been found desirable in schools or other institutions to mount a series of shower heads and their associated valve members on a wall of the building. This has the disadvantage of having the supply pipes and valves and all connecting conduits embedded in the wall or between two walls. This, of necessity, has to be installed before the wall can be finished and any repairs require that the wall finish, such as tile, be removed before access can be had to the water supply conduit.

Certain attempts have been made to supply panel type fixtures that may be mounted on the wall having the supply conduit mounted between the panel surface and the wall surface. The principal problem in panels of this type, which is prefabricated before installation, is the adjustment of the surface panels to each other on mounting. Heretofore recourse has been had to certain floating anchored strips which of necessity are fixed in position without access being had thereto. This is a difficult assembly problem which is not encountered in assembling the novel panel shower disclosed in the present invention.

Under certain conditions it is found desirable to mount these panel showers between the wall and an upright or between two uprights where the principal problem is the leveling of the device on installation.

It is an object of the present invention to provide a panel shower which may be installed on the wall of a building after the walls have been completely finished.

It is another object of the present invention to provide a surface mounted multi-station panel shower which may be readily prefabricated before delivery to the site of installation.

It is a further object of this invention to provide inside and outside corners with the necessary lateral adjustment means thereon for holding the front panels in position.

It is a still further object of this invention to provide a panel shower mounted between a wall and an upright having shower heads on each side thereof with the necessary associated valve members.

It is a still further object of this invention to provide a panel shower that may be mounted between two supports within a room and to provide the necessary adjustment features to level this unit on installation.

The various features of novelty which characterize this invention are pointed out with particularity in the claims annexed to and forming part of this application. For a better understanding of the invention, however, and the advantages possessed by it, reference should be had to the accompanying drawings and descriptive matter in which has been illustrated and described a preferred embodiment of the invention.

In the drawings:

FIG. 1 is a view in perspective of the prefabricated unit mounted on a wall so as to form a surface mounted multi-station panel shower.

FIG. 2 is an expanded view of a pair of front panels and their associated connecting means.

FIG. 3 is an expanded view of a front panel, an outside corner panel and its associated connecting means.

FIG. 4 is a sectional view on line 4—4 of FIG. 1.

2

Figure 5:
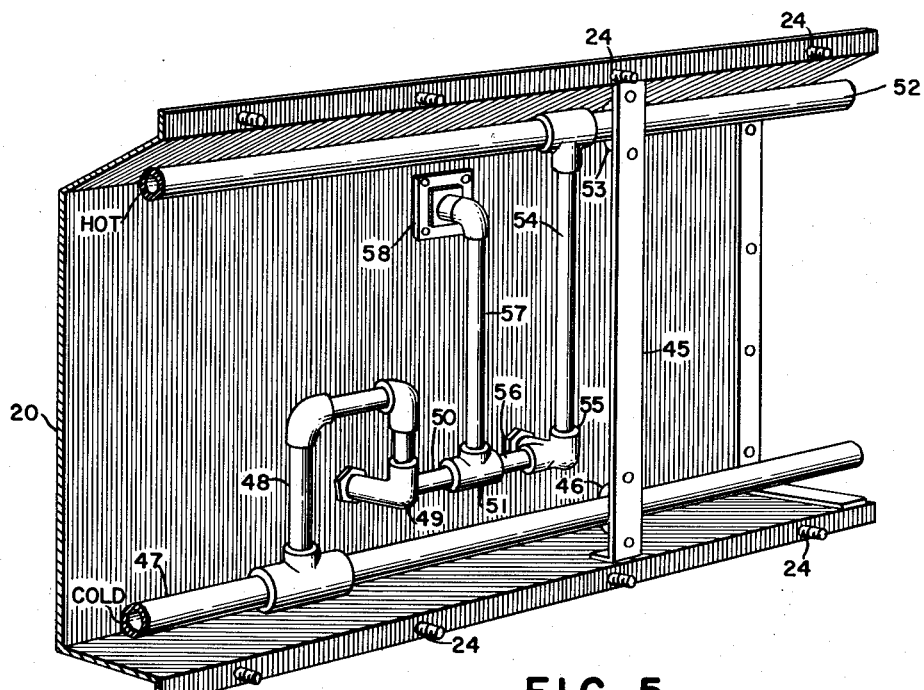

FIG. 5 is an enlarged rear view in perspective of one of the main panel units of this invention.

Figure 6:
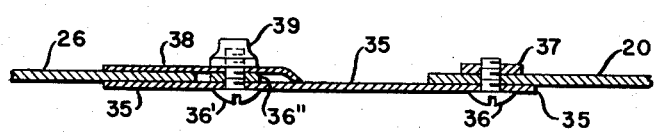

FIG. 6 is a sectional view, similar to FIG. 4, showing a modification of this invention.

Figure 7:
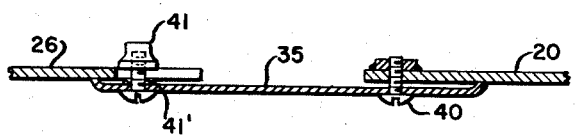

FIG. 7 is a sectional view, similar to FIG. 4, showing a second modification.

Figure 8:
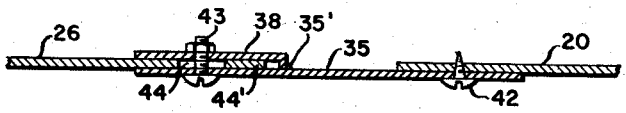

FIG. 8 is a sectional view, similar to FIG. 4, showing a third modification.

Figure 9:
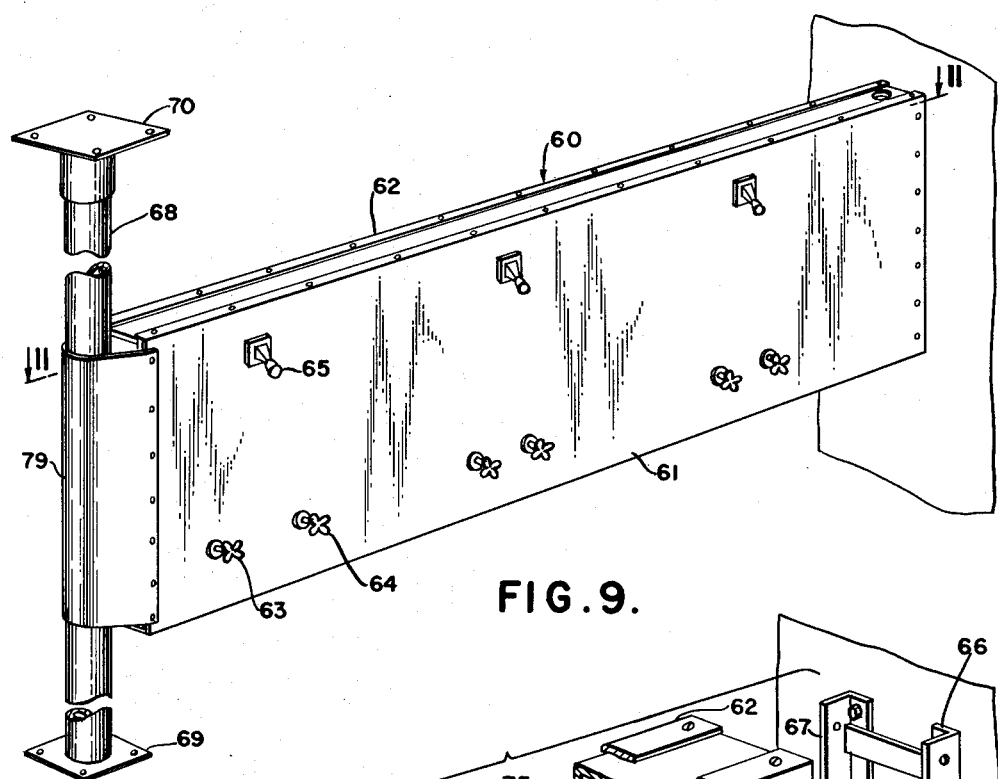

FIG. 9 is a perspective view of the panel shower mounted between the walls and an upright within the room.

Figure 10:
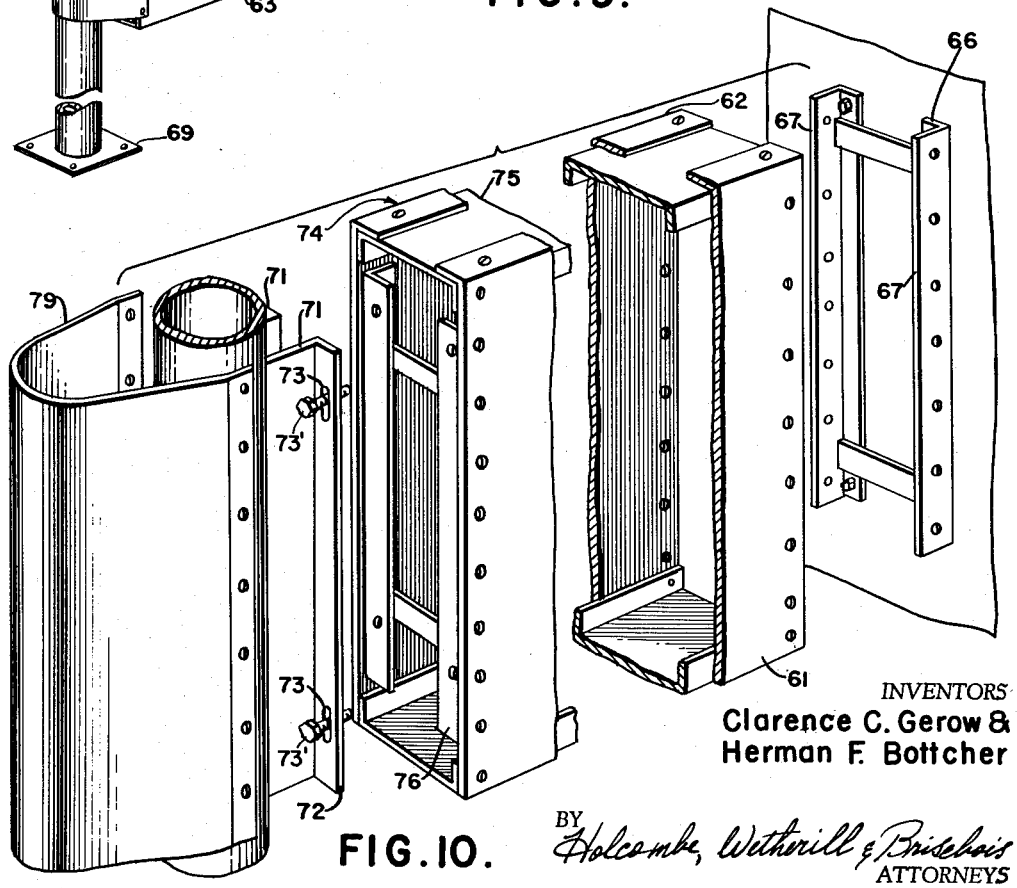

FIG. 10 is an expanded view, partially in section, showing the connecting means for the shower shown in FIG. 9.

FIG. 11 is a sectional view on line 11—11 of FIG. 9.

FIG. 12 is a rear view, partially in section, of the shower shown in FIG. 9.

A panel shower, for mounting on the wall, is shown in FIG. 1, wherein a front panel 20 has protruding therethrough the valves 21, 21 for controlling the cold water, and the valves 22, 22 for controlling the hot water. Above these valves are mounted the shower heads 23, 23. The panels are held in position by the screws 24, 24, along the top thereof and corresponding screws along the bottom thereof (not shown in FIG. 1, but the holes are shown in FIG. 5). A joining panel 25 is shown in expanded relation to the front panels 20 and 26, shown in FIG. 2. A corner panel 27 with the joining panel 25 and the front panel 20 is shown in FIG. 3. The inside corner panel 28 is constructed similarly to the outside corner panel 27 and has the joining panels 25, 25 adjacent thereto. The joining panel 25, shown in FIG. 2 has the front plate 29 with the screw holes 30, 30 on one side thereof and the screw holes 31, 31 on the other side thereof. The front panel 20 has a series of screw holes 32, 32 down the margin thereof to match with the screw holes 30, 30 in the panel 25. The joining panel 25 has an interior strip 33 shown in FIG. 4 with the bolt 34 passing through the hole 31 in the joining panel 29. This strip 33 receives the edge of the front panel 26 between the face of the front panel 29 and its associated elements as shown in FIG. 4.

A modification is shown in FIG. 6 wherein the front plate 35 has the machine bolts 36 mounted on the outside margin thereof. These bolts go through the holes 32, 32 in the front panel 20 and are held in position by the permanently mounted strips 37 welded to the main panel section 20 and drilled and tapped for machine screws 36 shown in FIG. 6 joining this edge of the front plate 35 with the front panel 20. The other edge of the front plate 35 has the inner strip 38 held in position by bolts 36' and their associated nuts 39 through the front plate, the washer 36'' being between the front plate 35 and the inner strip 38. The front panel 26 is received between the strip 38 and the front plate 35 and holds it in sliding engagement therewith. The strip 38 is thinner than the front plate 35 and the washer 36'' is thinner than the front panel 26.

A second modification is shown in FIG. 7 wherein the front panel 20 is attached to the front plate 35 by means of the screw elements on one margin and is attached to the front panel 26 by means of the machine bolts and its associated nuts 41. The slots in panel 26 furnish the sliding feature necessary for assembly. The strip 41' is welded to the interior surface of front plate 35 which strip is thinner than the return end portion.

A third modification is shown in FIG. 8 wherein the front panel 20 has the front plate 35 attached thereto by means of the screws 42 on one side and is attached to the front panel 26 by means of an inner strip 38 held in position by being welded to the front plate 35 at 35'. The bolt 43 and its associated nuts operate through the hole 44 in the front panel 26. The strip 44' spaces the front plate 35 from the inner strip 38 and is slightly thinner than front panel 26. The inner strip 38 is thinner than the front plate 35.

A bracket 45 shown in FIG. 5 has the clamp 46 on the bottom thereof to hold the cold water conduit 47 which has the take-off conduit 48 leading to the valve housings 49 and delivers cold water through the conduit 50 to the T 51. The hot water conduit 52 is held in position by the clamp 53 on the bracket 45. Hot water is delivered from the conduit 52 to the take-off conduit 54 to the valve housings 55 and supplies hot water through the conduit 56 to the T 51. The T 51 is connected to the conduit 57 through the shower head plate 58 which is attached to the interior surface of the front panel 20. The valve housing 49 and 55 have valve stems and associated handles 21 and 22 projecting through the front panel 20 so as to allow manual control of the hot and cold water flowing through the conduit 57 to the shower heads 23.

When this panel is assembled the bracket 45 has mounted on it the associated hot and cold water conduits and the bracket is rigidly mounted on the panel 20, as shown in FIG. 5. All of this assembly work is done at the factory. The complete assembly is then delivered to the place of installation and is mounted on the wall by means of the holes 24, 24 in the return section of the front panel. The bolts through these holes support the entire structure. The joining front panel 26 has an opening between it and the front panel 20, as shown in FIG. 2. The front plate 29 is then slipped into position so that the front panel 26 lies between the front plate 29 and the interior strip 33, shown in FIG. 4. This allows the holes 30 to be alined with the holes 32 and the screws 33' are then inserted in the hole 30 and fastened, as shown in FIG. 4. The bolts 34 are then tightened to firmly grip the front panel 26 between the front plate 29 and the interior strip 33. The alternative connecting means, shown in FIGS. 6, 7 and 8, are inserted in the same manner to join the front panel 20 with its adjacent front panel 26.

All front panels are joined in the same manner, that is, the outside corner panel 27 is connected to the front panel 20, as shown in FIG. 3, by means of the joining panels 25.

The partition panel 60, shown in FIG. 9, has the front panel 61 and the rear panel 62. Mounted on these panels are the valves 63, 64, for controlling the hot and cold water admitted to the shower heads 65, 65. This partition panel comprises a member 66 attached to the wall (shown in FIG. 10), having a portion 67, 67 at right angles to that portion attached to the wall. An upright 68 of the through-standing type attached to the floor by means of the plate 69 and to the ceiling by means of the plate 70 rigidly holds this upright in position. Welded on the upright are the plates 71, 71, shown in FIG. 10. These plates have a return portion 72, 72 thereon with the elongated slots 73, 73 therein. A metal frame 74 comprising an upper plate 75 and end plate 76 are attached to the front panel 61 and the rear panel 62. The hot and cold water conduits 77 and 78 with their associated valves and conduits leading from the valves to the shower heads are shown in FIGS. 11 and 12. When this panel is assembled the piping arrangement, shown in FIG. 12, is prefabricated in the factory, the plates 66 mounted on the wall, the through-standing upright 68 is mounted between the plates 70 and 69 and has welded thereon the plates 71, 71. The metal frame 74 with the piping assembly therein is mounted between plates 66 and the return portion 72 on the plate 71 which is welded to the upright. The slots 73 permit the leveling of this assembly and the long bolts 73' permit lateral adjustment. The end cover plate 79 is then placed around the upright and fastened to the front panel 61 and the rear panel 62, as shown in FIG. 9.

While in the above description a through standing upright is shown for purposes of illustration, the upright may not be of this type but may be attached only at one end.

Also in the above description the partition panels 60 are shown as being mounted on the wall by means of the elements 66 and 67. This is not necessary. The end opposite the upright can rest on top of a partition wall that does not go to the ceiling. That is, one end may be attached to an upright and the other may rest on the upper surface of a partition wall.

While in accordance with the provisions of the statute, there has been described the best form of embodiment of this invention known, it will be apparent to those skilled in the art that changes may be made in the process without departing from the spirit of this invention as set forth in the appended claims, and that in some cases certain features may be used to advantage without a corresponding use of other features.

What is claimed is:

1. An expansion unit for a prefabricated, surface mounted, plumbing fixture, comprising in combination:
    (a) two front panels, each having rearwardly offset flanges at opposite edges for seating against a building wall, said front panels having an opening therebetween,
    (b) means to attach said flanges to said wall,
    (c) a joining plate wider than said opening having a contour similar to each of said front panels, said joining plate having a series of matching holes at one edge thereof for attachment to one of said front panels,
    (d) said joining plate having an interior strip on the interior surface of said joining plate to receive said other panel between the rear surface of said joining plate and said interior strip, in sliding engagement therewith,
    (e) and bolts through said front plate and said interior strip to draw the said interior strip towards said front plate.

2. An expansion unit for a prefabricated, surface mounted, plumbing fixture, comprising in combination:
    (a) two front panels, each having rearwardly offset flanges at opposite edges for seating against a building wall, said front panels having an opening therebetween,
    (b) means to attach said flanges to said wall,
    (c) a joining plate wider than said opening having a contour similar to each of said panels, said joining plate having a series of matching holes at one edge thereof for attachment to one of said front panels,
    (d) said joining plate having an interior strip welded to the interior surface of said joining plate to receive said other panel between the rear surface of said joining plate and said interior strip,
    (e) and bolts through said joining plate and said interior strip with a washer therebetween that is thinner than said front panel to grip said front panel therebetween in sliding engagement therewith.

3. An expansion unit for a prefabricated, surface mounted, plumbing fixture, comprising in combination:
    (a) two front panels, each having rearwardly offset flanges at opposite edges for seating against a building wall, said front panels having an opening therebetween,
    (b) means to attach said flanges to said wall,
    (c) a joining plate wider than said opening having a contour similar to each of said front panels, said joining plate having a series of matching holes at one edge thereof for attachment to one of said front panels,
    (d) said joining plate having an interior strip welded to the interior surface of said joining plate to receive said other panel between the rear surface of said joining plate and said interior strip,
    (e) and bolts through said joining plate and said interior strip and a strip between said welded portion and said bolt thereby gripping said front panel therebetween in sliding engagement therewith.

4. A prefabricated unit for a surface mounted surface fixture, comprising in combination:
   (a) two front panels each having rearwardly offset flanges at opposite edges for seating against a building wall, each front panel having a series of shower heads mounted thereon and a series of valves for controlling the flow of water thereto, said front panels having an opening therebetween,
   (b) means to attach said flanges to said wall,
   (c) a joining plate wider than said opening having a contour similar to each of said front panels, said joining plate having a series of matching holes at one edge thereof for attachment to one of said front panels,
   (d) said joining plate having an interior strip welded to the interior surface of said joining plate to receive said other panel between the rear surface of said joining plate and said interior strip,
   (e) and means to draw said interior strip towards the front plate, thereby gripping said front panel therebetween in sliding engagement therewith.

5. A prefabricated unit for a surface mounted plumbing fixture, comprising in combination:
   (a) two front panels each having rearwardly offset flanges at opposite edges for seating against a building wall, each front panel having a series of shower heads mounted thereon and a series of valves for controlling the water supply thereto, said front panels having an opening therebetween,
   (b) means to attach said flanges to said wall,
   (c) a joining plate wider than said opening having a contour similar to each of said front panels and having returned edges, said joining plate having a series of matching holes at one edge thereof for attachment to one of said front panels,
   (d) said joining plate having an interior strip on the interior surface thereof thinner than said return edge portion,
   (e) means to draw said joining plate against said front panel thereby forcing said return edges into contact with said front panels.

6. A prefabricated unit of the partition panel type, comprising, in combination:
   (a) a frame comprising an upper plate and a lower plate, front and rear panels attached to said frame to form an elongated fixture, supply conduits and associated conduits located within said frame, connecting mixing valves and shower heads mounted on each of said front and rear panels,
   (b) a plate having returned edge portions rigidly mounted on a wall to receive one end of said fixture, means for attaching said front and rear panels to said returned portion,
   (c) two plates mounted in the end of said frame at the end opposite to the end attached to the wall, fastening means holding said plates to said front and rear panels, said plates having returned portions with holes therein,
   (d) and an upright having two flanges mounted thereon with returned portions having elongated vertical slots therein to receive bolts for attachment to said plate mounted in the end of said free standing fixture to aline the same in vertically and horizontally adjustable relation with the attachment to said wall.

7. A prefabricated unit of the partition panel type, comprising, in combination:
   (a) a frame comprising an upper plate and a lower plate, front and rear panels attached to said frame to form an elongated fixture, supply conduits and associated conduits located within said frame connecting mixing valves and shower heads mounted on each of said front and rear panels,
   (b) a plate having returned edge portions to close one end of said fixture, means for attaching said front and rear panels to said returned portion,
   (c) plates mounted in the end of said frame opposite to the closed end fastening means holding said plates to said front and rear panels, said plates having a returned portion with holes therein,
   (d) and an upright having two flanges mounted thereon with returned portions having elongated vertical slots therein to receive bolts for attachment to said plate mounted in the end of said free standing fixture to aline the same.

References Cited in the file of this patent

UNITED STATES PATENTS

| | | |
|---|---|---|
| 1,800,562 | Nilson | Apr. 14, 1931 |
| 1,925,867 | Dunlop | Sept. 5, 1933 |
| 2,002,789 | Niedecken | May 28, 1935 |
| 2,349,490 | Doke | May 23, 1944 |
| 2,992,437 | Nelson et al. | July 18, 1961 |
| 2,992,438 | Nelson et al. | July 18, 1961 |